United States Patent Office 3,098,842
Patented July 23, 1963

3,098,842
STABILIZED POLYOLEFINS
John Brian Armitage and Rolf Dessauer, Wilmington, and Archibald Miller Hyson, Newark, Del., assignors to E. I. du Pont de Nemours and Company, Wilmington, Del., a corporation of Delaware
No Drawing. Filed Aug. 17, 1961, Ser. No. 132,019
7 Claims. (Cl. 260—45.95)

This invention relates to plastic compositions of matter, and more particularly to polyethylene compositions and to articles made therefrom having improved properties with respect to resistance to light, especially in the ultra violet (U.V.) range (2900–3600 A.).

This application is a continuation-in-part of U.S. application S.N. 762,274, filed September 22, 1958, now U.S. Patent No. 3,006,959.

Over a period of years, considerable research attention has been directed to developing an effective, non-discoloring U.V. stabilizer for the polymers of ethylene. Many initially promising leads have been investigated with discouragingly frequent failures. Moreover, neither commercial products, literature nor patents reveal that a wholly satisfactory adjuvant had been found, prior to this invention. Certain substituted hydroxybenzophenones have been suggested for use as light stabilizers for various plastics, none, however, have been found to be particularly effective in polyolefine compositions.

An object of this invention is to provide plastic compositions, based on normally solid polyolefins, which are resistant to discoloration when exposed to ultra violet light. Another object is to provide compositions of such polymeric materials stabilized against such exposure. Another object is to provide such compositions having increased stability performance. Yet another object of the invention is to provide compositions of polyethylene containing compatible compounds having a hydroxybenzophenone nucleus and bis phenol compounds. Still another object is the substantial retardation of degradation of polyolefine compositions by ultra violet light through the use of compositions containing a hydroxybenzophenone nucleus that is non-migrating, non-volatile in character and remains permanently associated with the polyolefine. Other objects and advantages of the invention will hereinafter appear.

This invention relates to the use of compounds containing a hydroxybenzophenone nucleus which has been made compatible with branched and/or linear polyolefines by attaching a long hydrocarbon chain substituent to the nucleus. To effect compatibility, the long hydrocarbon chain or chains are attached to hydroxybenzophenone nuclei and related nuclei having these chemical structures:

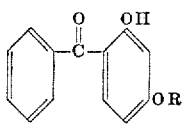

and

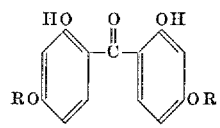

in which R is a hydrocarbon group such as an alkyl or aralkyl group that contains from 8 to 32 carbon atoms. These polyolefine stabilizers can be incorporated into polyolefines and are effective in amounts up to about 1% by weight of the polyolefines without exudation ("blooming") occurring even after extended periods of use.

General methods for preparing the hydroxybenzophenone ethers are known and are described, for example, in U.S. Patent 2,773,903 of Hardy et al., December 11, 1956.

The polyolefine constituents of the plastic U.V. stabilized composition of the invention include the conventional normally solid branched chain polyethylenes; the linear polyethylenes, such as are prepared by any suitable process such, for example, as the processes of the Larchar and Pease U.S. Patent 2,816,883, issued Dec. 17, 1957; and the Pease and Roedel U.S. Patent 2,762,791, issued Sept. 11, 1956; and the polyolefines of alkenes of higher molecular weight than ethylene, such as propene, butene, pentene, etc. The compounds containing the hydroxybenzophenone nucleus of the invention likewise markedly improve the resistance of copolymers of the above olefines or copolymers of the above olefines with other polymerizable organic compounds.

The hydroxybenzophenone nucleus-containing adjuvants are incorporated into the polyolefin in concentrations between 0.0005% and about 1% by weight; those with the longer hydrocarbon chains are generally more compatible than those with the shorter chains. The bis phenol antioxidants are incorporated into the polyolefins in concentrations between 0.001 and about 0.5% by weight of the polyolefin. The compositions are formed by any suitable method such, for example, as working the polyolefin and the adjuvants and antioxidants on a rubber mill at a temperature between 140 and 200° C., dissolving the adjuvants in a suitable solvent such as acetone, hexane, and benzene, and spraying the solution into a Banbury mixer containing the polyolefin, or by any other suitable method known to the art for adding small amounts of an adjuvant to polyolefins, such as the methods shown in the Latham and Strain U.S. Patent 2,434,662, issued Jan. 20, 1948.

The hydroxybenzophenone adjuvants and the bisphenol antioxidants of the examples given below were milled into polyethylene on a two-roll mill at 160±5° C. for 10 minutes. Films (10 mil) compression molded from these compositions were then exposed to accelerated weathering tests. Filtered light with wet and dry cycles (18 min. wet and 102 min. dry) in an Atlas Weather-Ometer was used to simulate outdoor conditions. The stabilization obtained with the combination of hydroxybenzophenone adjuvants and bisphenol antioxidants is illustrated and compared with polyethylene film containing no stabilizer of any kind and which such film containing only an antioxidant, the Elmendorf tear test (A.S.T.M. 689–44) and melt index test (A.S.T.M. D1238–

52) were used as the basis for comparison. In the table, Elm designated the Elmendorf test and M.I. the melt index test.

ACCELERATED WEATHERING OF POLYETHYLENE FILMS
(10 MIL)

| | Adjuvant | Percent By Wt. | Control | | 500 Hrs. | | 1,000 Hrs. | |
|---|---|---|---|---|---|---|---|---|
| | | | Elm | M.I. | Elm | M.I. | Elm | M.I. |
| 1 | U.V. 1 / Antioxidant 1 | 1.0 / 0.1 | 119 | 2.34 | 149 | 0.62 | 127 | 0.18 |
| 2 | U.V. 2 / Antioxidant 1 | 0.2 / 0.1 | 125 | 2.41 | | | 45 | 0.09 |
| 3 | U.V. 3 / Antioxidant 1 | 1.0 / 0.1 | 151 | 2.3 | 149 | 0.38 | 147 | 0.09 |
| 4 | U.V. 4 / Antioxidant 1 | 0.4 / 0.1 | 108 | 2.34 | | | 31 | .29 |
| 5 | Antioxidant 1 alone | 0.2 | 124 | 2.16 | 42 | .90 | Brittle | |
| 6 | None | | 102 | 2.20 | Brittle | | | |
| 7 | U.V. 1 Alone | 0.2 | 101 | 2.43 | | | Brittle | |
| 8 | U.V. 2 Alone | 1.0 | 125 | 2.60 | | | 42 | 0.41 |
| 9 | U.V. 3 Alone | 0.4 | 109 | 2.19 | | | Brittle | |
| 10 | U.V. 4 Alone | 0.4 | 129 | 2.25 | | | Brittle | |
| 11 | U.V. 1 / Antioxidant 2 | 1.0 / 0.1 | 122 | 2.45 | | | 82 | 0.04 |
| 12 | U.V. 1 / Antioxidant 3 | 1.0 / 0.1 | 134 | 2.31 | | | 90 | 0.07 |
| 13 | U.V. 1 / Antioxidant 4 | 1.0 / 0.1 | 132 | 2.14 | | | 81 | 0.02 |
| 14 | U.V. 1 / Antioxidant 5 | 1.0 / 0.1 | 125 | 2.42 | | | 89 | 0.02 |
| 15 | Antioxidant 2 Alone | 0.2 | 123 | 2.37 | | | Brittle | |
| 16 | Antioxidant 3 Alone | 0.2 | 130 | 2.30 | | | Brittle | |
| 17 | Antioxidant 4 Alone | 0.2 | 127 | 2.28 | | | Brittle | |
| 18 | Antioxidant 5 Alone | 0.2 | 126 | 2.26 | | | Brittle | |
| 19 | U.V. 5 / Antioxidant 1 | 1.0 / 0.1 | 127 | 2.40 | | | 120 | 0.27 |
| 20 | U.V. 5 Alone | 1.0 | 125 | 2.35 | | | Brittle | |

Adjuvants:
 U.V. 1—2-hydroxy-4-octyloxybenzophenone.
 U.V. 2—2-hydroxy-4-decyloxybenzophenone.
 U.V. 3—2-hydroxy-4-dodecyloxybenzophenone.
 U.V. 4—2-hydroxy-4-hexadecyloxybenzophenone.
 U.V. 5—2-hydroxy-4-betaphenylethyloxybenzophenone.
Antioxidants:
 Antiox. 1—4,4'-thiobis(6-t-butyl-m-cresol).
 Antiox. 2—2,2'-methylenebis (4-methyl-6-t-butyl phenol).
 Antiox. 3—4,4'-butylidenebis (6-t-butyl-m-cresol.
 Antiox. 4—4,4'-methylenebis (2,6-di-t-butyl phenol).
 Antiox. 5—4,4'-bis (2,6-di-t-butyl phenol).

The compositions shown in the table in polyethylene are equally effective in polypropylene.

As shown in the above table, the Elmendorf tear strength of the films containing the hydroxybenzophenone and the bis phenol were not seriously effected by the exposure. Although not wishing to be bound by a particular theory of why the changes occur in melt index, and Elmendorf tear, and why some films become brittle, it is believed that the ultraviolet light causes the polymer to crosslink initially and at a later time degrade. Thus in the case of decrease in melt index, the polymer has crosslinked considerably but has not degraded significantly. While in the case of brittleness, the polymer has degraded significantly and the polymer has not crosslinked significantly, or at least the degradation has exceeded the crosslinking. Crosslinking in the absence of degradation would be expected to increase the toughness of the polymer and thus increase the value for Elmendorf tear.

The hydroxybenzophenones having low molecular weight hydrocarbon substituents such as the methyl, ethyl, and phenyl substituents are, it has been found, unsuitable and ineffective as U.V. stabilizers for the polyolefines. The methyl and ethyl and like substituted ketones are quite volatile while the intermediate alkyl- and phenyl-substituted derivatives are incompatible even when used in amounts as low as 1%. When higher molecular weight substituents are present, however, there is not only compatibility of the hydroxybenzophenone compound with the polyolefine but also effective U.V. stabilization of the polymer.

Particularly effective compounds containing the hydroxybenzophenone nuclei, which compounds are modified sufficiently by a substituent group to render them compatible with polyolefines, include 2-hydroxy-4-octyloxybenzophenone, 2-hydroxy-4-dodecyloxybenzophenone, 2-hydroxy-4-octadecyloxybenzophenone, 2,2'-dihydroxy-4,4'-dioctyloxybenzophenone, and 2,2'-dihydroxy-4,4'-didodecyloxybenzophenone.

*Preparation of 2-Hydroxy-4-n-Octyloxybenzophenone*

A mixture of 21.4 parts of 2,4-dihydroxy-benzophenone, 28.5 parts of 1-bromooctane, 20.7 parts of potassium carbonate and 237 parts of acetone were refluxed for 16 hours and filtered hot from the inorganic salts formed. Then, the filtrate was concentrated by distillation to ⅓ its volume and the liquid cooled. Long needles of 2-hydroxy-4-n-octyloxybenzophenone crystallized out and these were filtered off and washed with ethanol. The product (23 parts) melted at 45° to 46° C. Its identity was confirmed by analysis: Found (calc.): percent C, 77.6 (77.2); percent H, 8.1 (7.98).

*Preparation of 2-Hydroxy-4-n-Dodecyloxybenzophenone*

A mixture of 53.5 parts of 2,4-dihydroxybenzophenone, 93 parts of 1-bromododecane, 51.5 parts of potassium carbonate and 593 parts of acetone were refluxed for 16 hours and filtered hot from the inorganic salts formed. The filtrate was concentrated to ¼ its volume and allowed to cool. The crystals which formed were filtered off and washed with ethanol. The product (67 parts) melted at 49° to 50° C. and its identity was confirmed as 2-hydroxy-4-n-dodecyloxybenzophenone by analysis.

We claim:

1. A light resistant composition containing a normally solid polymer of an α-monoolefin containing less than 5 carbon atoms; and 0.0005% to about 1% by weight of the polymer of a compound having the formula:

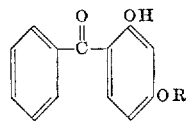

in which R is a hydrocarbon of the group consisting of alkyl and aralkyl groups containing 8 to 20 carbon atoms; and 0.001 to 0.5% by weight of the polymer of an antioxidant selected from the class consisting of 4,4'thiobis(6-t-butyl-m-cresol); 2,2'-methylene bis(4-methyl-6-t-butyl-m-cresol); 4,4'-butylidene(6-t-butyl-m-cresol); 4,4'-methylene bis (2,6-di-t-butyl phenol); and 4,4'-bis(2,6-di-t-butyl phenol).

2. A light-resistant composition containing a normally solid polymer of an α-monoolefin containing not more than 5 carbon atoms; 0.0005 to about 1% by weight of the polymer of a compound containing a hydroxybenzophenone having the chemical formula:

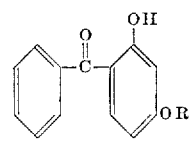

in which R is a hydrocarbon of the group consisting of alkyl and aralkyl groups containing from 8 to 20 carbon atoms; and 0.001 to 0.5% by weight of the polymer of 4,4'thiobis(6-t-butyl-m-cresol).

3. A light resistant composition containing a normally solid polyethylene; 0.0005 to 1% by weight of 2-hydroxy-4-octyloxybenzophenone; and 0.001 to 0.5% by weight of 4,4'-thiobis(6-t-butyl-m-cresol).

4. A film of the composition of claim 1.

5. A light resistant composition containing a normally solid polyethylene; 0.0005 to 1% by weight of 2-hydroxy-4-dodecyloxybenzophenone; and 0.001 to 0.5% by weight of 4,4'-thiobis(6-tert-butyl-m-cresol).

6. The composition of claim 1 in which the polymer is polyethylene and R is an alkyl group.

7. The composition of claim 2 in which the polymer is polyethylene and R is an alkyl group.

References Cited in the file of this patent

UNITED STATES PATENTS

| | | |
|---|---|---|
| 2,985,617 | Sayler et al. | May 23, 1961 |
| 3,006,959 | Armitage et al. | Oct. 31, 1961 |

UNITED STATES PATENT OFFICE
CERTIFICATE OF CORRECTION

Patent No. 3,098,842            July 23, 1963

John Brian Armitage et al.

It is hereby certified that error appears in the above numbered patent requiring correction and that the said Letters Patent should read as corrected below.

Column 4, line 51, for "m-cresol);", first occurrence, read -- phenol); --.

Signed and sealed this 21st day of April 1964.

(SEAL)
Attest:

ERNEST W. SWIDER
Attesting Officer

EDWARD J. BRENNER

Commissioner of Patents